(12) United States Patent
Chamberlain et al.

(10) Patent No.: US 7,165,798 B2
(45) Date of Patent: Jan. 23, 2007

(54) INSTRUMENT MOUNTING ASSEMBLY

(75) Inventors: Michael D. Chamberlain, Bellevue, WA (US); Michael Stephen Rafferty, Madison, WI (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 10/788,936

(22) Filed: Feb. 27, 2004

(65) Prior Publication Data

US 2005/0173938 A1 Aug. 11, 2005

Related U.S. Application Data

(60) Provisional application No. 60/542,375, filed on Feb. 6, 2004.

(51) Int. Cl.
*B60R 7/04* (2006.01)

(52) U.S. Cl. .................................................. 296/37.1

(58) Field of Classification Search ............... 296/37.1, 296/24.3, 24.34, 191, 37.8, 37.12, 70, 72, 296/73, 1.07, 1.08; 248/27.1, 27.3, 298.1; 246/298.1; 361/685, 726, 683, 725, 727; 224/281, 282, 483; 312/322, 323; 108/6, 108/143

See application file for complete search history.

(56) References Cited

U.S. PATENT DOCUMENTS

| | | | |
|---|---|---|---|
| 1,809,296 A | | 6/1931 | Heina |
| 2,662,975 A | | 12/1953 | Schwarz |
| 2,866,891 A | | 12/1958 | Princ |
| 4,082,387 A | | 4/1978 | Davis |
| 4,103,983 A | | 8/1978 | Morrison et al. |
| 4,368,866 A | | 1/1983 | Urban et al. |
| 4,640,542 A | | 2/1987 | Watjer et al. |
| 4,684,164 A | * | 8/1987 | Durham ..................... 296/37.7 |
| 4,710,136 A | | 12/1987 | Suzuki |
| 4,807,292 A | | 2/1989 | Sorscher |
| 4,829,595 A | | 5/1989 | Kobayashi et al. |
| RE33,112 E | * | 11/1989 | Durham ..................... 296/37.7 |
| 4,881,910 A | | 11/1989 | Odemer |
| 4,941,718 A | * | 7/1990 | Alexander et al. .......... 312/312 |
| 4,947,661 A | | 8/1990 | Yoshida |
| 4,955,678 A | | 9/1990 | Kobayashi |

(Continued)

FOREIGN PATENT DOCUMENTS

DE 1430573 A1 12/1968

(Continued)

*Primary Examiner*—H. Gutman
(74) *Attorney, Agent, or Firm*—Christensen O'Connor Johnson Kindness PLLC

(57) ABSTRACT

An instrument mounting assembly (100) for mounting an instrument (102) to a vehicle (200) is provided. The assembly includes a carrier (114) coupled to the vehicle (200) and a support (108) coupled to the carrier, the support adapted to support an instrument (102). The assembly includes a first track (132 or 156) disposed on the carrier and a first follower (130 or 134) disposed on the support for interfacing with the first track. The assembly further includes a second track (132 or 156) disposed on the support and a second follower (130 or 134) disposed on the carrier for interfacing with the second track. The support may be transitioned between stowed and extended positions, wherein the first and second followers interface with the first and second tracks causing the support to be both linearly displaced and rotated while the support is transitioned between the positions.

43 Claims, 14 Drawing Sheets

U.S. PATENT DOCUMENTS

| | | |
|---|---|---|
| 5,020,151 A | 5/1991 | Sampei et al. |
| 5,073,978 A * | 12/1991 | Mastrippolito ............... 455/346 |
| 5,211,459 A * | 5/1993 | Wu ........................ 312/223.2 |
| 5,262,923 A * | 11/1993 | Batta et al. ................ 361/685 |
| 5,506,563 A | 4/1996 | Jonic |
| 5,510,955 A * | 4/1996 | Taesang ..................... 361/685 |
| 5,560,572 A | 10/1996 | Osborn et al. |
| 5,779,197 A | 7/1998 | Kim |
| 5,823,495 A | 10/1998 | Joss et al. |
| 5,864,627 A | 1/1999 | Kim |
| RE36,075 E | 2/1999 | Jonic |
| 6,042,168 A * | 3/2000 | Bieri ....................... 296/37.12 |
| 6,213,533 B1 | 4/2001 | Widulle et al. |
| 6,616,106 B1 | 9/2003 | Dean et al. |
| 6,666,414 B2 * | 12/2003 | Dean et al. ................. 248/27.3 |
| 2002/0066832 A1 * | 6/2002 | Kwon ........................ 248/27.3 |
| 2003/0160134 A1 * | 8/2003 | Upson et al. .............. 248/27.3 |

FOREIGN PATENT DOCUMENTS

FR      2819765 A      7/2002

* cited by examiner

INSTRUMENT MOUNTING ASSEMBLY

CROSS-REFERENCE TO RELATED APPLICATION

This application claims the benefit of U.S. Provisional Patent Application No. 60/542,375, entitled Instrument Mounting Assembly, filed Feb. 6, 2004, the disclosure of which is hereby expressly incorporated by reference and priority from the filing date of which is hereby claimed under 35 U.S.C. § 119.

FIELD OF THE INVENTION

The present invention generally relates to instrument mounting assemblies for mounting instruments in vehicles, and more particularly to instrument mounting assemblies for selectively positioning an instrument between a stowed position and an extended position within a vehicle.

BACKGROUND OF THE INVENTION

The present invention generally relates to assemblies used for mounting instruments in a vehicle, and more specifically to assemblies for mounting Citizen Band (CB) radios in a vehicle. Previous to the present invention, CB radios were mounted in one of two ways. In the first way, the CB radio is permanently flush mounted in the dash or header (the area above the windshield but below the roof) like a car radio. When mounted in this manner, the CB radio is not easily changed out. However, these permanent flush mount systems are aesthetically pleasing and place the CB radio in an out of the way protected environment. The other mounting method is to mount the CB radio in an exposed manner with brackets upon the dash or header. This mounting method is not aesthetically pleasing and places the CB radio in an exposed position, and therefore the CB radio can be easily damaged.

However, this latter system allows drivers easy access to the CB radio. This is especially advantageous to drivers who wish to change out or access the CB radio frequently. Heavy duty Class 8 trucks are often operated by several drivers in shifts. Typically, each driver likes to use his or her own CB radio when operating the truck. Thus, since easy access to the radio is important, they sacrifice the aesthetics and the protection of flush mounted CB radios and use the bracket mounting system. This permits the drivers to easily swap out the CB radio at an end of each shift. Thus, there exists a need for an instrument mounting assembly which provides the aesthetics and protection afforded by a flush mounted system while also providing easy access to the CB radio to facilitate the removal of the CB radio and installation of another CB radio.

SUMMARY OF THE INVENTION

One embodiment of an instrument mounting assembly formed in accordance with the present invention for mounting an instrument to a vehicle is described below. The instrument mounting assembly includes a carrier adapted to be coupled to the vehicle and a support coupled to the carrier, the support adapted to support an instrument. The instrument mounting assembly further includes a first track disposed on the carrier, a first follower disposed on the support for interfacing with the first track, a second track disposed on the support, and a second follower disposed on the carrier for interfacing with the second track. The support is movable relative to the carrier so that the support may be transitioned from a stowed position to an extended position, wherein the first and second followers interface with the first and second tracks causing the support to be both linearly displaced and rotated while the support is transitioned from the stowed to the extended position.

An alternate embodiment of an instrument mounting assembly formed in accordance with the present invention is provided for adjustably mounting an electronic device relative to a panel of a vehicle, the electronic device having a front face and a back surface, is described below. The instrument mounting assembly includes a support for supporting the electronic device and a guide assembly. The guide assembly is used for guiding the movement of the support between a stowed position, in which an electronic device coupled to the support is configured such that the front face of the electronic device is substantially flush with the panel, and an extended position. In the extended position, the support is moved outward from the panel and rotated such that when the electronic device is attached to the support, the front face of the electronic device is spaced a selected distance outward of the panel and the electronic device is oriented at a predetermined inclination relative to the electronic device when in the stowed position to provide a user with access to the electronic device.

In addition, an alternate embodiment of an instrument mounting assembly formed in accordance with the present invention for mounting an electronic device to a vehicle is described below. The electronic device has a front face. The instrument mounting assembly includes a support for supporting the electronic device, the support having a front portion. The instrument mounting assembly further includes a coupling assembly for movably coupling the support to the vehicle such that the support may be selectively moved between a stowed position and an extended position. The coupling assembly includes a rear guide assembly for guiding a rear portion of the support in a first path and a front guide assembly for guiding a second portion of the support in a second path. When the support is transitioned from the stowed to the extended position, the front portion of the support moves in a predetermined path resulting from the movement of the rear and second portions of the support along the first and second paths. The predetermined path has at least an arcuate portion such that the support is rotated when transitioned to the extended position.

A further alternate embodiment of an instrument mounting assembly formed in accordance with the present invention for removably mounting an electronic device to a vehicle having an instrument panel is described below. The instrument mounting assembly includes a support for supporting the electronic device and a coupling assembly. The coupling assembly is used for movably coupling the support to the vehicle such that the support may be selectively moved to place the electronic device between a stored position in which the electronic device is disposed substantially behind the instrument panel and an extended position. In the extended position, the coupling assembly holds the support a selected distance outward of the instrument panel and inclined at a predetermined angle relative to the stowed position such that a user may manually access the electronic device to disconnect any cable assemblies coupled thereto while the electronic device is supported by the support.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
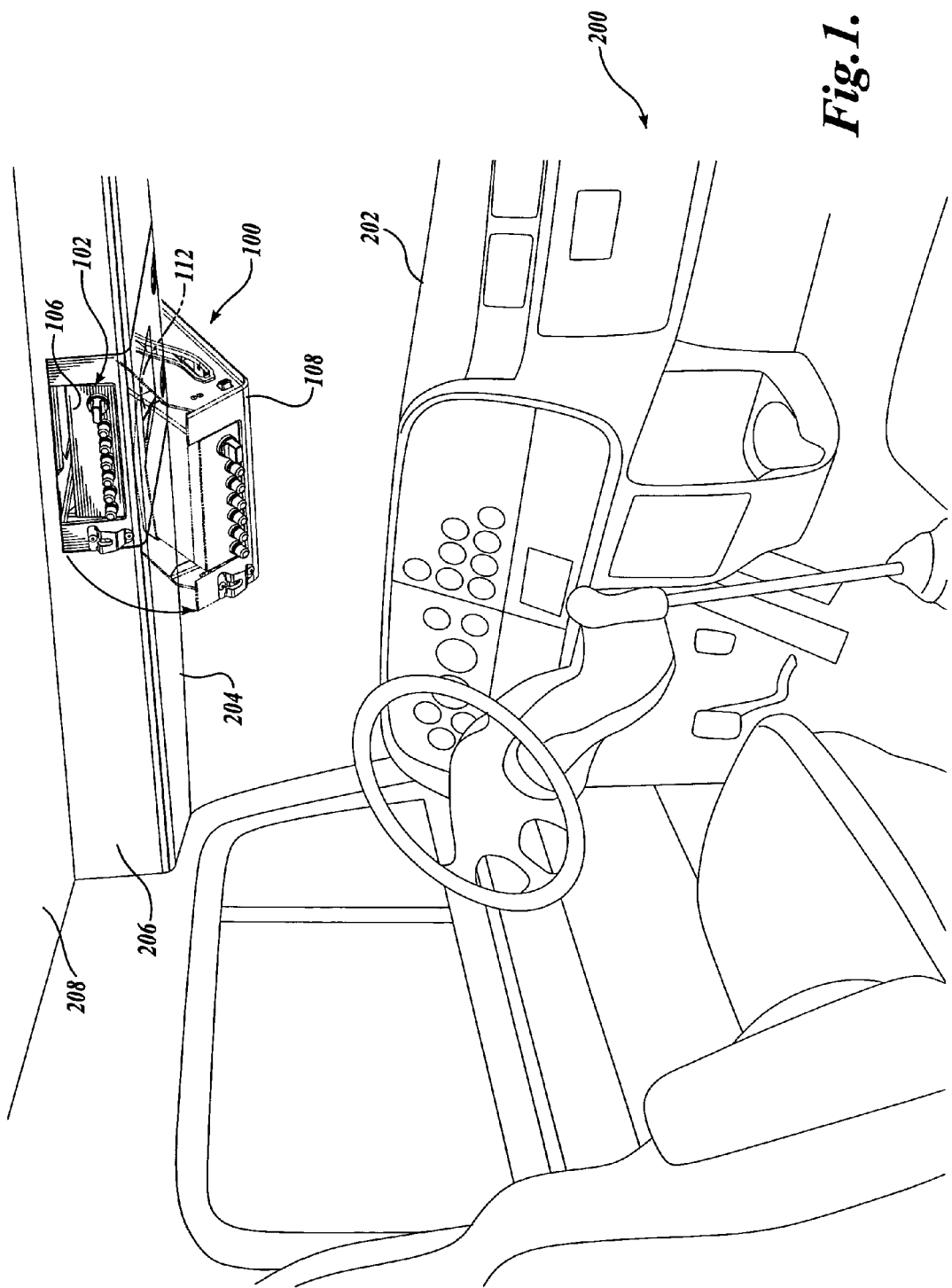
FIG. 1 is a perspective view of one embodiment of an instrument mounting assembly formed in accordance with the present invention for mounting an instrument within a vehicle, the instrument mounting assembly including a carrier supporting a support tray to which the instrument is affixed, the instrument mounting assembly adapted to position the instrument between a stowed position as shown in solid lines and an extended position as shown in phantom.

Referring to enclosed FIGS. 1–10, one embodiment of an instrument mounting assembly 100 for mounting instruments, such as electronic devices, one suitable example being a Citizen Band (CB) radio, in a vehicle 200 is disclosed. Referring to FIG. 1, the instrument mounting assembly 100 permits a CB radio 102 to be positioned between a stowed position shown in solid lines and an extended position shown in phantom lines. The stowed position is a flush mount or recessed position, wherein the CB radio 102 held by the instrument mounting assembly 100 is disposed substantially within/behind/below a dash 202 or header 204 such that a front face 106 of the CB radio 102 is substantially flush with an outer surface 206 of the dash 202 or header 204. The extended position is wherein a support tray 108 supporting the CB radio 102 is moved outward from the outer surface 206 of the dash 202 or header 204.

In the extended position, a user has full access to the CB radio 102 to remove/install/adjust/repair the unit while the unit is supported by the instrument mounting assembly 100. Further, the user has access to a restraining strap 112 used in retaining the CB radio 102 to the support tray 108. Once the restraining strap 112 is released, the user can pull forward the CB radio 102 to gain full access to the back of the CB radio 102 to uncouple the vehicle's cabling from the CB radio 102 while the CB radio 102 rests upon the support tray 108.

The CB radio 102 may be moved between the two positions with all of the electrical cabling (i.e. power cable, ground cable, antenna cable, speaker cables, etc.) still connected. Since the user has full access to the CB radio 102 when in the extended position, a first driver can uncouple the electrical cabling from the CB radio 102 and remove the CB radio 102 from the support tray 108. The second driver can then couple their CB radio to the support tray 108 and connect the vehicle electrical cabling to their CB radio, then place their CB radio in the stowed position for use. This permits nearly any CB radio 102 to be easily switched out (i.e. swapped) with any other CB radio (even though the CB radios are made by different manufactures or are different models of the same manufacturer).

Figure 8:
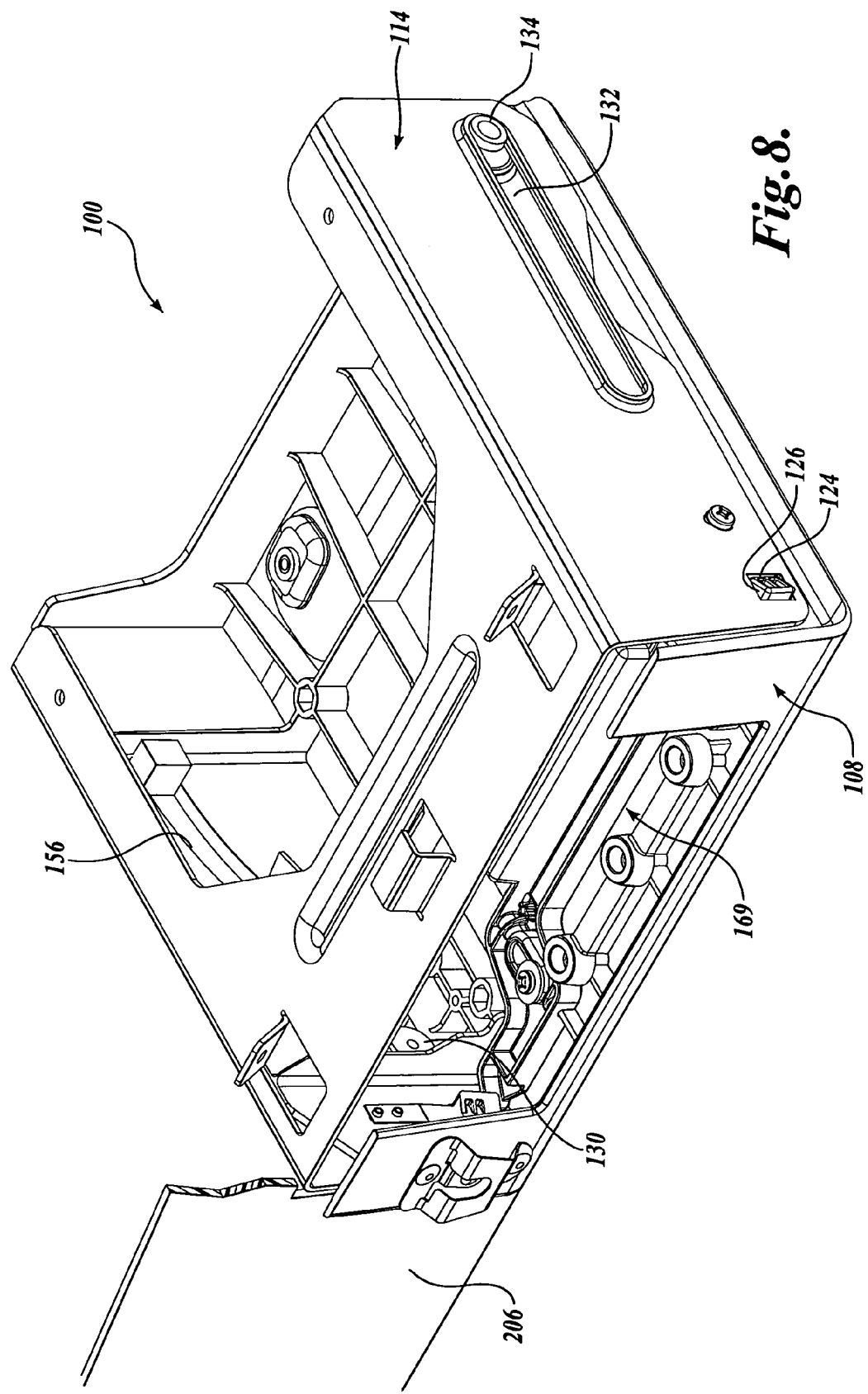
FIG. 8 is a perspective view of the instrument mounting assembly depicted in FIG. 1 with the support tray shown in the stowed position.

Referring to FIG. 8, the structure of the instrument mounting assembly 100 will now be described. The main components of the instrument mounting assembly 100 are a carrier 114 and the support tray 108. This detailed description will first focus upon the structure of the carrier 114. Generally described, the carrier 114 is an interface member, facilitating the coupling of the support tray 108 to the vehicle in such a manner as to permit the support tray 108 to move between the stowed and extended positions.

Figure 2:
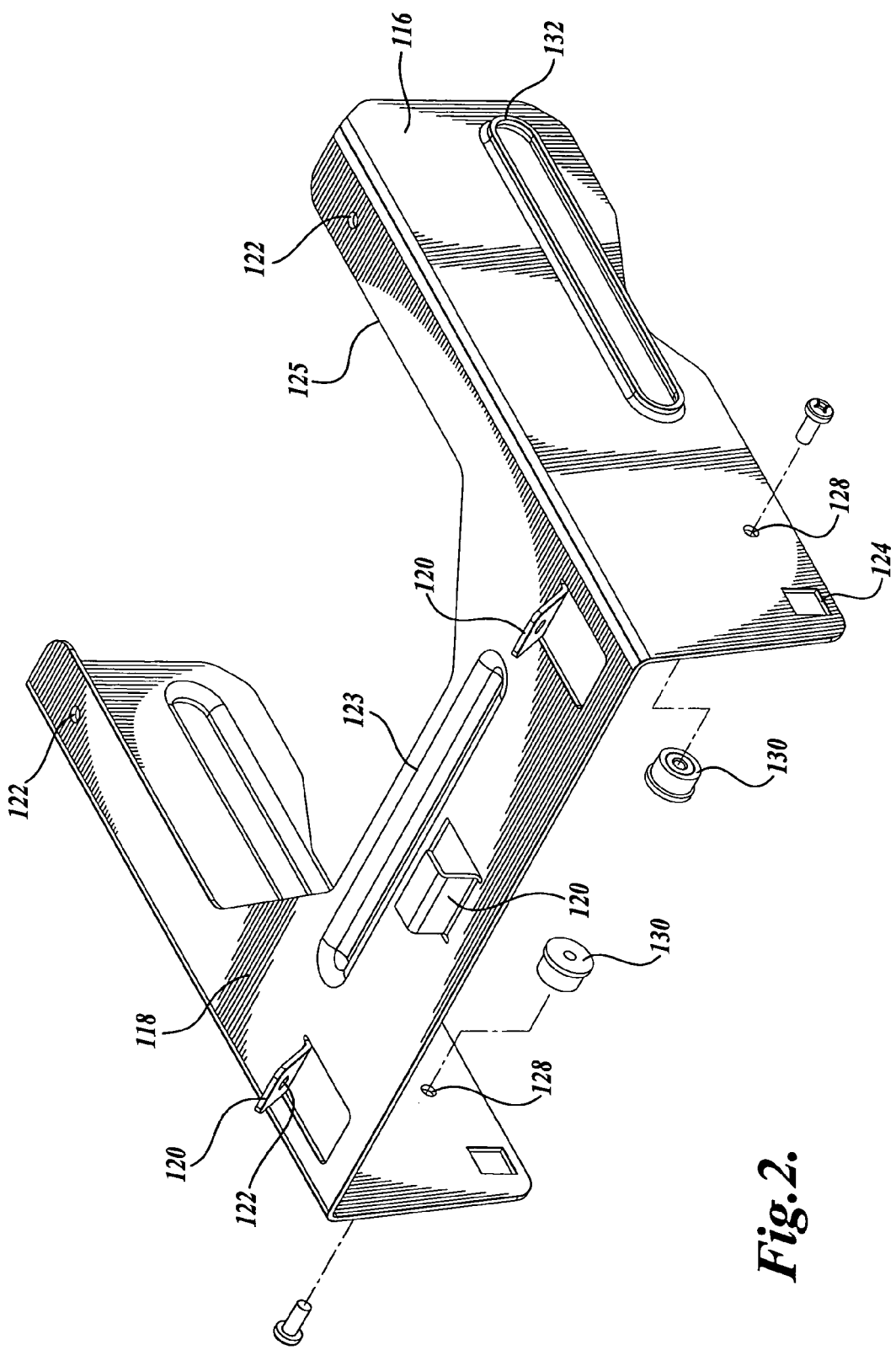
FIG. 2 is a perspective view of the carrier depicted in FIG. 1.

Turning to FIG. 2 and directing our attention to the specific structure of the illustrated carrier 114, the carrier 114 includes two parallel and vertically oriented sidewalls 116. The sidewalls 116 are interconnected by a horizontally oriented top wall 118. The top wall 118 is oriented perpendicular to the two sidewalls 116. The top wall 118 includes several mounting structures 120 and mounting apertures 122 to facilitate the coupling of the carrier 114 to the vehicle. In the illustrated embodiment, the carrier 114 is mounted to the vehicle such that the carrier 114 is substantially disposed behind the outer surface 206 of the dash 202 or header 204, or upon the interior surface of the roof 208 or under the dash 202 of the vehicle (See FIG. 1 for reference numerals greater than 200). The top wall 118 further includes a strengthening trough 123 which serves to increase the rigidity of the carrier 114. The aft portion of the top wall 118 has been removed, creating a clearance cutout 125 which permits the top, rear edge of the CB radio to pass above the height of the top wall 118 by passing through the clearance cutout 125 as the CB radio is inclined in transition from the stowed position to the extended position. Of note, for this detailed description, the terms left, right, fore, aft, forward, and rearward are used in relation to the orientation of the CB radio, such that forward means toward the face 106 of the CB radio 102 and aft means away from the face 106 of the CB radio 102 (See FIG. 1).

Each sidewall 116 includes an aperture or locking socket 124. Although the locking socket may take many forms, the locking socket 124 of the illustrated embodiment is square in shape. The locking socket 124 is located on the lower, front corner of the sidewall 116. The locking socket 124 is sized and positioned to receive a locking plunger 126 (See FIG. 9) when the CB radio is disposed in the stowed position, thereby locking the instrument mounting assembly 100 in the stowed position, as will be described in further detail below.

Each sidewall 116 further includes a roller mounting aperture 128. The roller mounting aperture 128 permits the coupling of a bushing, post, or roller 130 to the sidewall 116. Each sidewall 116 further yet includes a guidance track 132. The guidance track 132 of the illustrated embodiment is substantially horizontally oriented. Further, the guidance track 132 is linear, although other orientations and shapes are within the spirit and scope of the present invention. The guidance track 132 is sized and configured to guide a roller 134 (See FIG. 3) therewithin, as will be described in further detail below.

Figure 3:
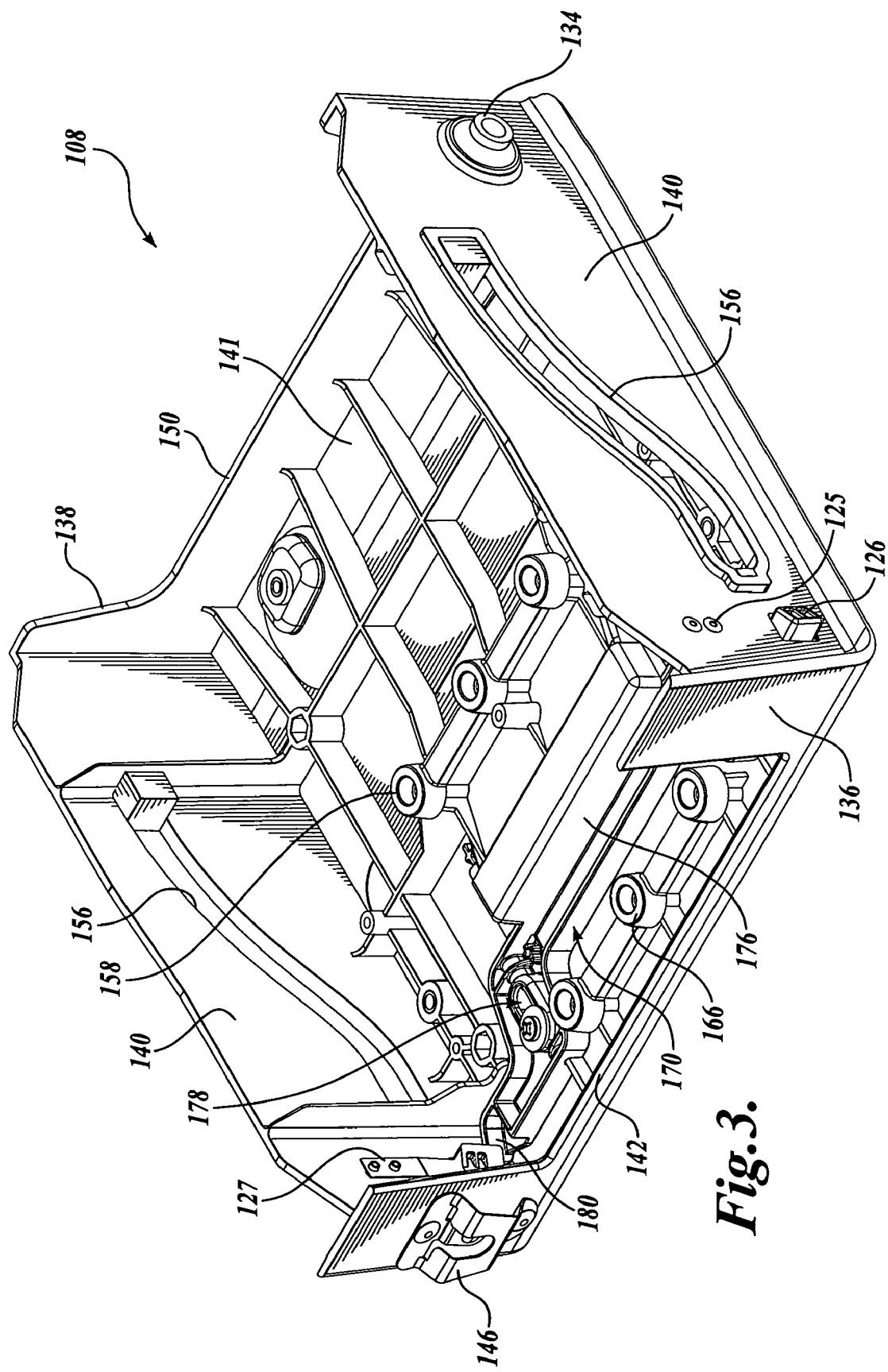
FIG. 3 is a perspective view of the support tray depicted in FIG. 1.
Figure 4:
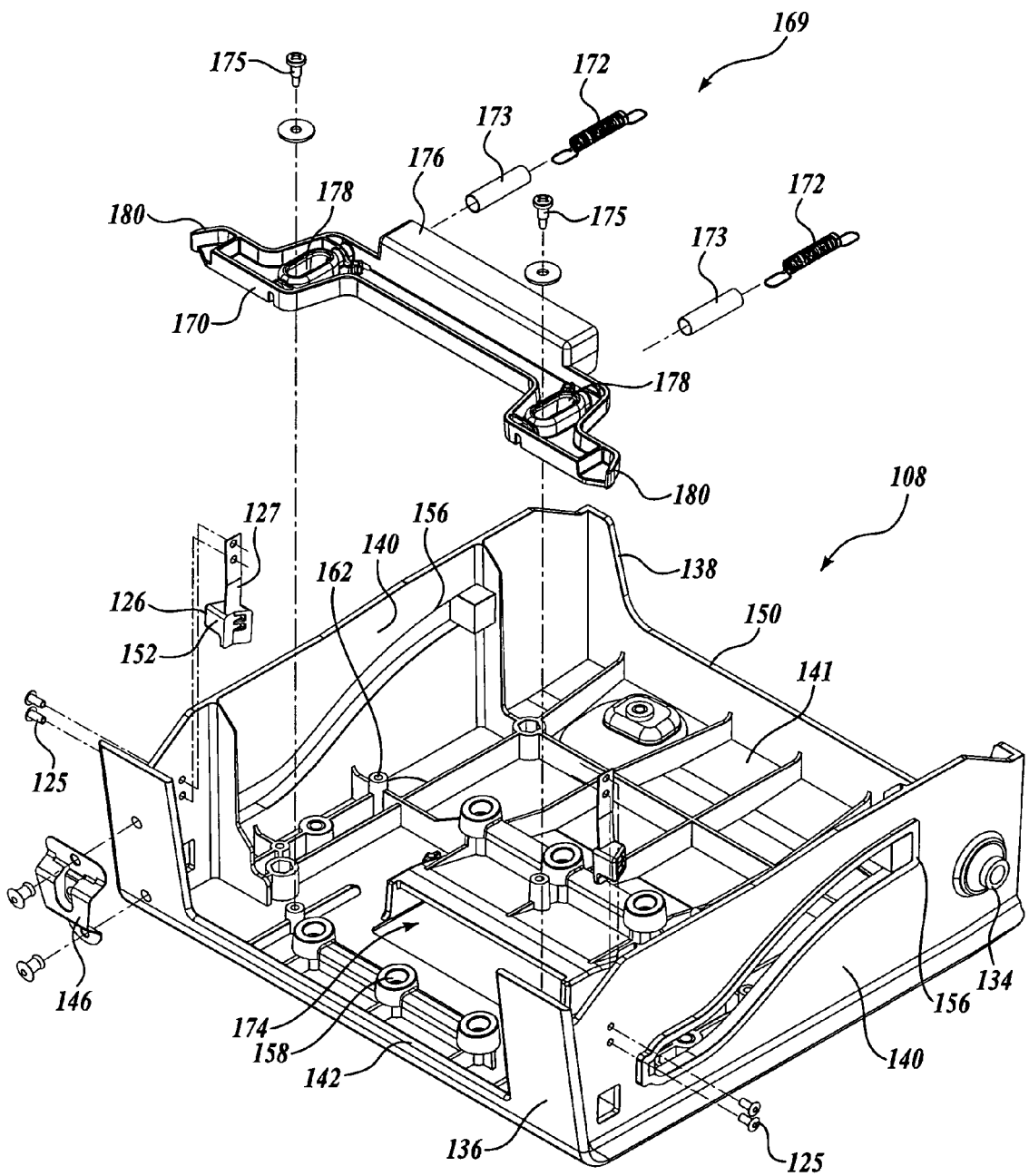
FIG. 4 is an exploded perspective view of the support tray depicted in FIG. 1.

Referring to FIGS. 3 and 4, this detailed description will now focus upon the support tray 108. The support tray 108 includes a front wall 136, a rear wall 138, two side walls 140, and a bottom panel 141. The front wall 136 is inclined slightly relative to a vertical plane. The front wall 136 includes a clearance cutout 142 which permits the controls 144 of the CB radio 102 to extend therethrough so as to be accessible to a user (See FIG. 9). Mounted to the front wall 136 is a CB radio microphone hanger 146 for supporting the microphone when not in use.

The back wall 138 is a substantially vertically oriented member. The back wall 138 includes a clearance cutout 150 which permits vehicle cabling (not shown), which typically consists of antenna and power cables, to extend therethrough for coupling to appropriate connectors disposed on the back end of the CB radio.

The side walls 140 are oriented substantially perpendicular to the back wall 138 and in a substantially vertical orientation. The side walls 140 each include a post, bushing or roller 134 mounted thereto. Each roller 134 is sized and positioned to cooperatively roll within one of the guidance tracks 132 disposed on one of the side walls 116 of the carrier 114 (See FIG. 2). Coupled to each of the side walls 140 is one of the locking plungers 126. The locking plungers 126 are preferably mounted to the side walls 140 such that the locking plungers 126 are biased to an outward locking position, wherein a distal end of the locking plunger 126 may interlock with the locking sockets 124 of the side walls 116 of the carrier 114 (See FIG. 2) to lock the support tray 108 in the stowed position.

In the illustrated embodiment, each of the locking plungers 126 are coupled to a cantilever spring 127 to bias the locking plungers 126 outward. Moreover, one end of the cantilever spring 127 is coupled to the side wall 140 by fasteners, such as a pair of rivets 125. A locking plunger 126 is then coupled to the free end of the cantilever spring 127. The cantilever springs 127 are configured to normally bias the locking plungers 126 outward toward the locking sockets 124 disposed in the side walls 116 of the carrier 114 (See FIG. 2).

Turning now to FIGS. 4–7, the instrument mounting assembly includes a release assembly 169, for selectively disengaging the locking plungers 126 from the locking sockets 124 (See FIG. 2). The release assembly 169 includes a slide assembly 170. The slide assembly 170 is slidingly coupled to the support tray 108 and is actuatable from a normally retracted position shown in FIG. 6 to a release position shown in FIG. 7. The slide assembly 170 is coupled to the support tray 108 by two fasteners 175 which slide within two slots 178 in the slide assembly 170, thereby restricting the movement of the slide assembly to linear motion in the direction of the slots 178.

Figure 7:
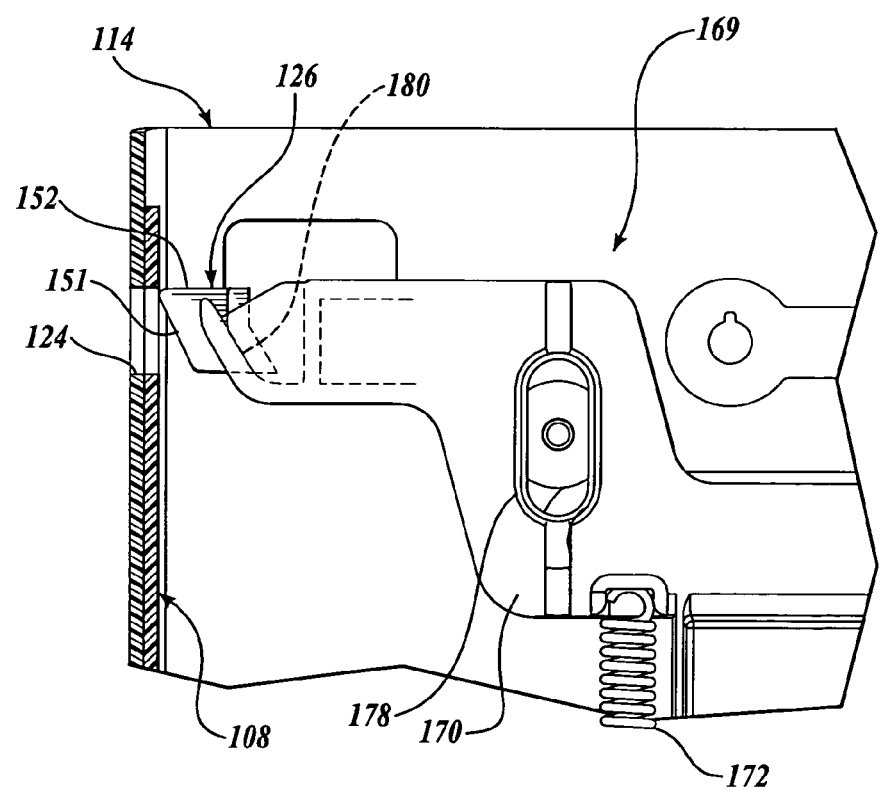
FIG. 7 is a bottom detail view of the instrument mounting assembly depicted in FIG. 1 showing the support tray in cross-section and a release assembly in a release position.

The slide assembly 170 is biased into the retracted position by a pair of springs 172. The springs 172 are each encased in a sheath 173. A user may reach under the instrument mounting assembly 100 and into a recess 174 to access an exposed portion or handle 176 of the slide assembly 170 disposed in proximity to the recess 174. By pulling forward on the handle 176, the spring 172 bias is overcome and the slide assembly 170 is slid forward, guided by the pair of slots 178 in the slide assembly 170. When slid forward to the release position, an engagement wedge 180 disposed on each side of the slide assembly 170 engages the locking plungers 126, moving the locking plungers 126 inward into the release position such that the locking plungers 126 no longer engage the locking sockets 124 as shown in FIG. 7. The support tray 108 and attached CB radio may then be slid and rotated forward into the extended position.

Of note, the distal ends 151 of the locking plungers 126 are inclined relative to the planar surfaces of the side walls 140. This permits the front edge of the side walls 116 of the carrier 114 to contact and push in the locking plungers 126 as the support tray 108 is transitioned from the extended position to the stowed position. Once in the stowed position, the locking plungers 126 spring outward into the locking sockets 124, thereby locking the support tray 108 in the stowed position. The forward vertical surface 152 of the locking plungers 126 engage the locking socket 124 to thereby impede the support tray 108 from transitioning back to the extended position until the locking plungers 126 are depressed inward. Once the locking plungers 126 are depressed inward through use of the release assembly 169, the distal ends of the locking plungers 126 are removed from the locking sockets 124, thereby permitting the support tray 108 to be freely transitioned to the extended position.

Referring to FIGS. 3 and 4, each sidewall 140 further includes a guidance track 156. The guidance track 156 is sized and configured to receive the post, bushing, or roller 130 coupled to the side wall 116 of the carrier. The guidance track 156 is preferably curvilinear in shape so as to selectively incline the support tray 108 as the support tray is transitioned from the stowed position to the extended position, although it should be apparent that other shapes are within the spirit and scope of the present invention, including arcuate and linear shapes. The inclining of the support tray 108 in the stowed position enhances user access to the CB radio and restraining strap, making repair/removal/maintenance easier. In the illustrated embodiment, the support tray 108 is angularly displaced approximately 35 degrees downward when transitioned from the stowed position to the extended position, however, it is apparent to those skilled in the art that other angular displacements are within the spirit and scope of the present invention, including angular displacements less than or greater than 35 degrees.

The ends of the guidance track 156 are preferably linear in shape, with an arcuate section connecting the linear end sections. This permits linear movement of the support tray 108 when the support tray 108 is initially moved outward from the stowed position. Preferably the average inclination of the guidance track 156 is inclined relative to the average inclination of the guidance track 130 disposed on the carrier 114 (See FIG. 2). This causes the support tray 108 to be rotated as the support tray 108 is transitioned between the stowed and extended positions.

Figure 5:
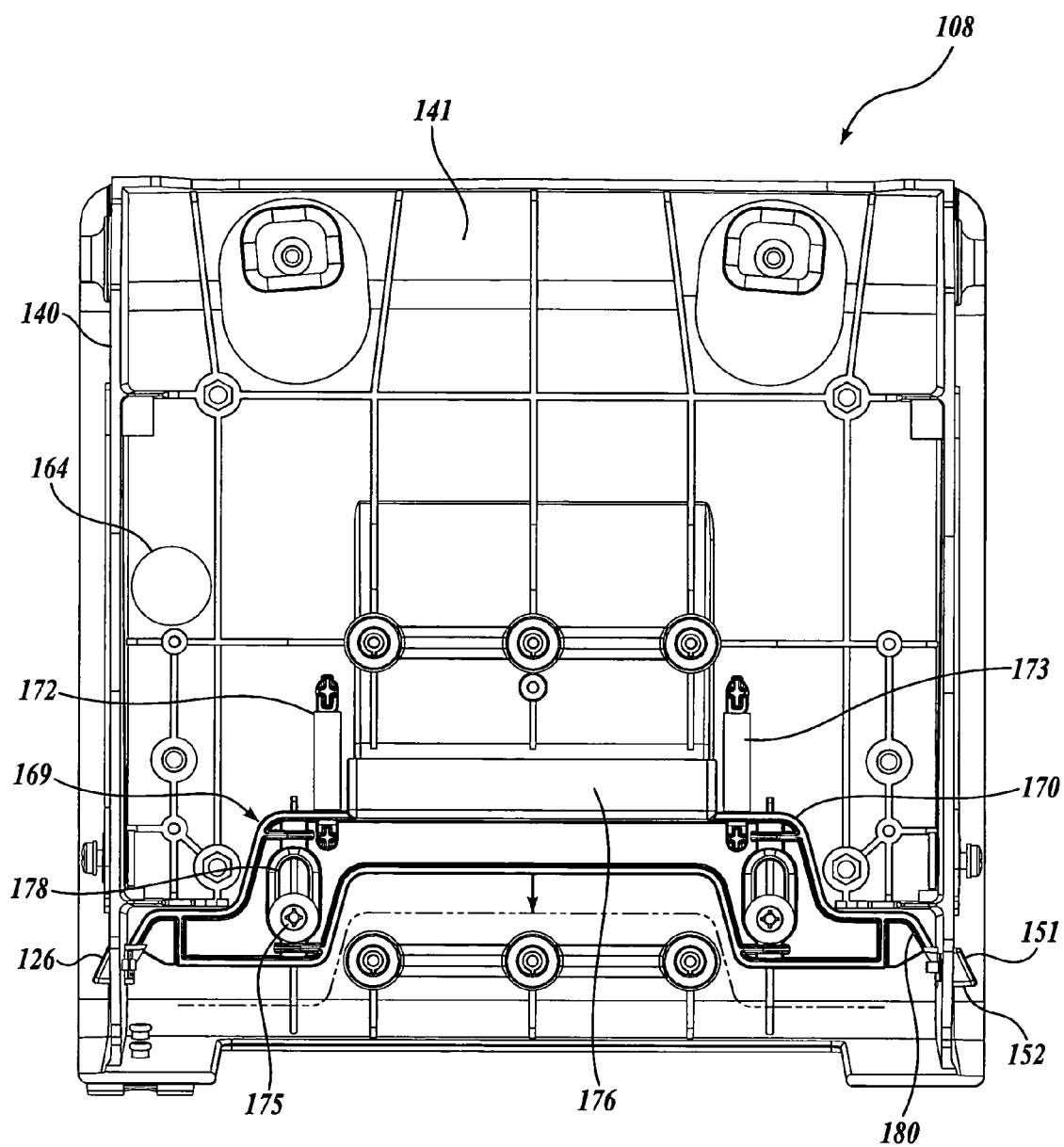
FIG. 5 is a top planar view of the support tray depicted in FIG. 1.
Figure 6:
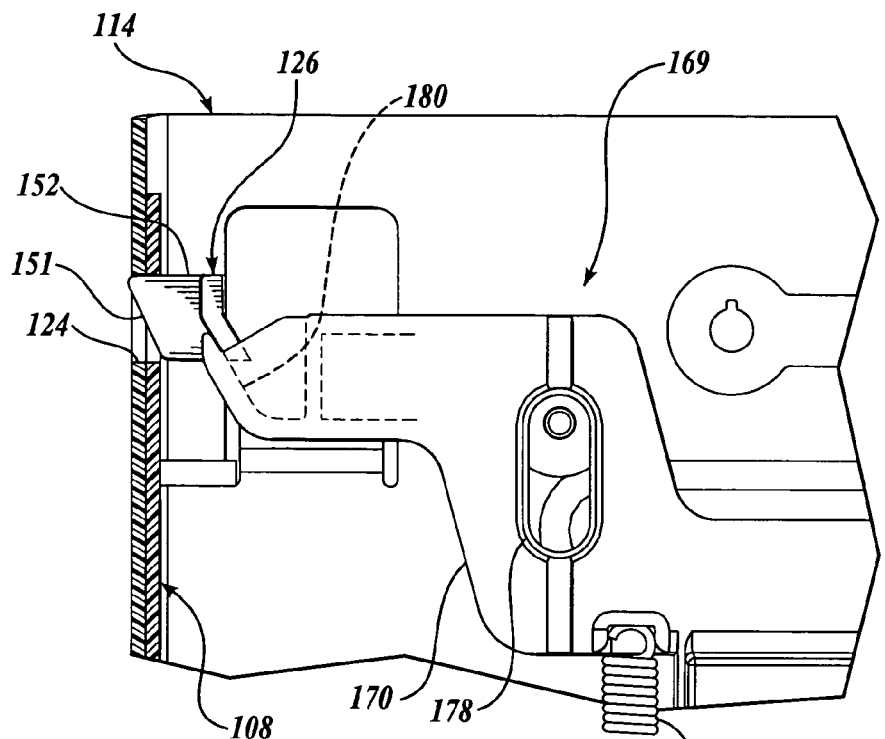
FIG. 6 is a bottom detail view of the instrument mounting assembly depicted in FIG. 1 showing the support tray in cross-section and a release assembly in a locked position.

The bottom panel 141 is a substantially planar member adapted to support and secure the CB radio to the instrument mounting assembly 100. The bottom panel 141 includes a plurality of rubber mounts 158 for supporting and impeding the movement of various models of CB radios held within the support tray 108. Restraining strap mounting posts 162 are disposed adjacent each side wall 140 to permit the restraining strap 112 (See FIG. 9) to be fastened thereto. Referring to FIG. 5, a pop-out 164 or drill-out portion of the bottom panel 141 is disposed adjacent the right side wall 140. The pop-out 164 may be drilled or popped out to permit the passage of a microphone cable therethrough, thereby permitting CB radios having side mount microphones to be easily mounted to the instrument mounting assembly.

Turning to FIG. 3, the bottom panel 141 includes a support surface 166. The support surface 166 is the surface which supports the CB radio when set within the support tray 108, and is mostly defined by the top surfaces of the rubber mounts 158. In this embodiment, the support surface 166 is inclined relative to a horizontal plane so as to be slightly inclined when the support tray 108 is in the stowed position. Thus, when in the stowed position, the CB radio 102 is inclined downward toward the driver for improved physical and visual access of the CB radio.

Figure 9:
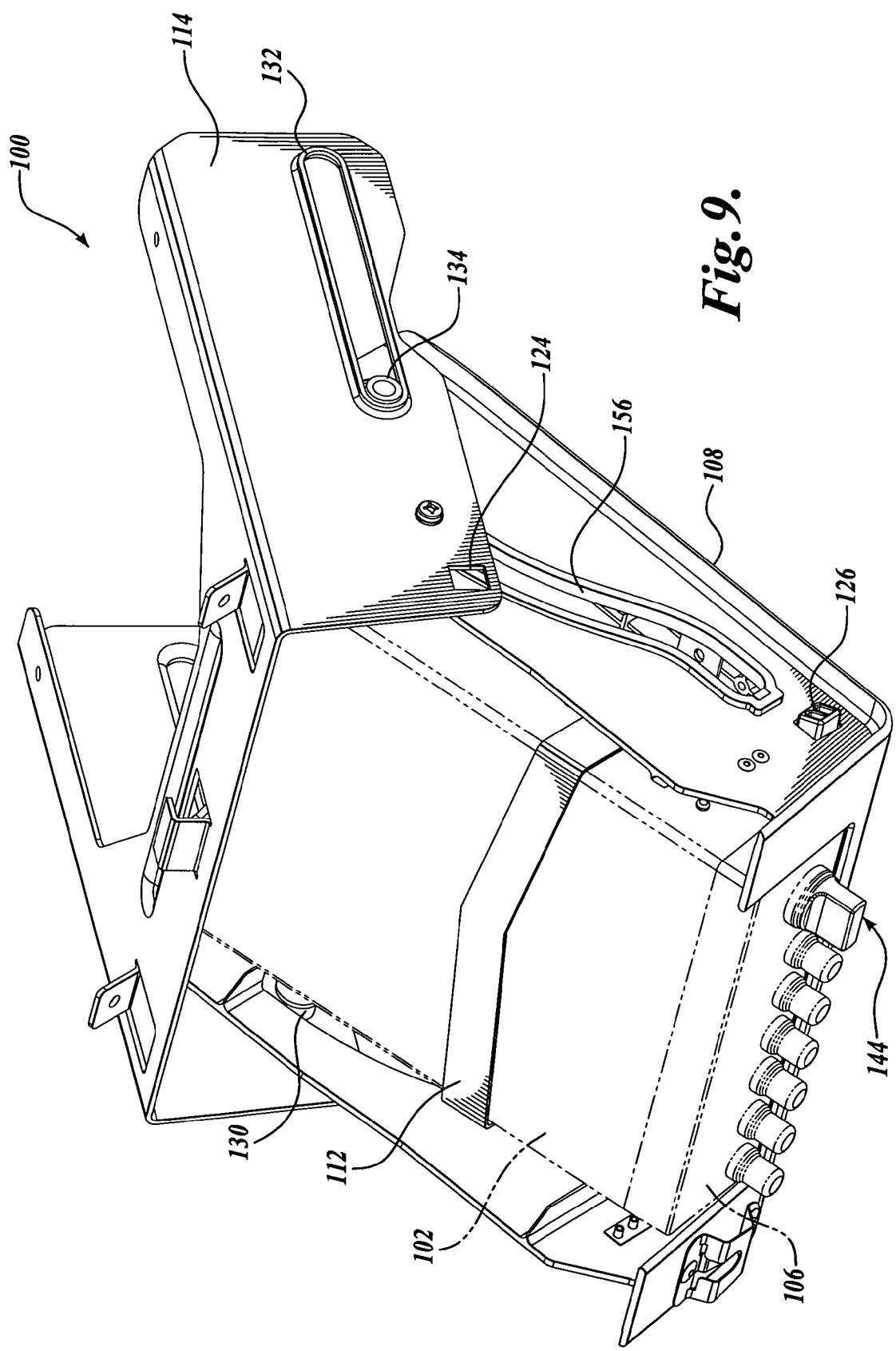
FIG. 9 is a perspective view of the instrument mounting assembly of FIG. 1 with the support tray shown in the extended position.

Referring to FIG. 9, with regard to construction materials for the instrument mounting assembly 100, any suitable rigid or semi-rigid materials may be used, a few examples being metal for the carrier 114 and injection molding materials for the support tray 108.

Figure 10:
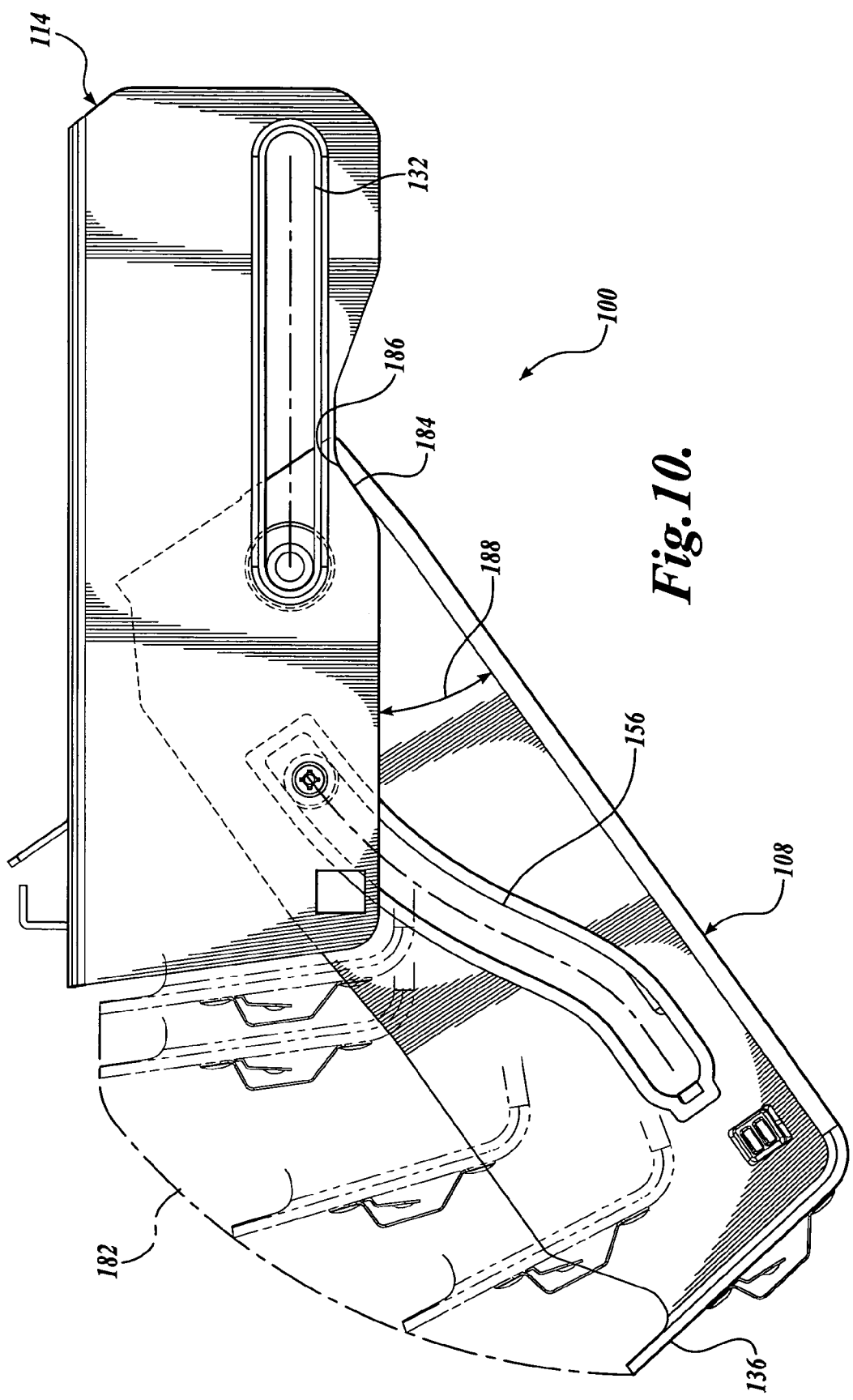
FIG. 10 is a side elevation view of the instrument mounting assembly of FIG. 1, showing the motion of the support tray as the support tray is transitioned from the stowed position to the extended position.

Referring now to FIGS. 8–10, in light of the above description of the components of the instrument mounting assembly 100, the operation of the instrument mounting assembly 100 will now be discussed. In FIG. 8, the instrument mounting assembly 100 is depicted in the stowed position. The front face 106 of the CB radio 102 is oriented substantially flush with the outer surface 206 of the header or dash. The CB radio 102 is thus disposed in a protected environment, i.e. protected from spills and debris contamination. Further, the CB radio 102 is in an aesthetically pleasing position, being partially hidden from view, presenting a clean, uncluttered appearance.

If a user wishes to transition the CB radio 102 to the extended position, such as to commence a repair, adjustment, or replacement of the unit, the locking plungers 126 are depressed inward through use of the release assembly 169. This frees the support tray 108 to move forward. The movement of the support tray 108 in the forward direction is guided by the post, bushing, or roller's 134 movement within guidance track 132 and by the post, bushing or roller's 130 movement within guidance track 156. Inasmuch as guidance track 156 is non-linear in shape, and more specifically downward sloping, the front end of the support tray 108 dips down during extension, thereby inclining the CB radio approximately 35 degrees as the CB radio 102 transitions to the extended position to improve user visual and physical access to the CB radio. To remove the CB radio 102, the user removes restraining strap 112 and pulls the CB radio forward, thereby exposing the electrical connectors at the rear of the CB radio. The user then uncouples the vehicle cabling coupled to the connectors and removes the CB radio.

A new CB radio, such as owned by the second shift driver, may now be installed. Of note, the support tray 108 supports the CB radio during the uncoupling and coupling of the electrical connectors to the vehicle cabling, thereby facilitating installation and removal. Once the new CB radio 102 is installed, the support tray 108 is pushed in an aft direction, transitioning the support tray 108 and CB radio 102 from the extended position into the stowed position. Once in the stowed position, the locking plungers 126 spring outward, engaging the locking sockets 124, thereby locking the support tray 108 in the stowed position.

Referring to FIG. 10, the motion of the support tray 108 as the support tray 108 is transitioned from the stowed position to the extended position will be described in greater detail. Moreover, the motion of the support tray 108 is determined by a combination of the movements defined by the guidance tracks 132 and 156. Guidance track 132 is substantially linear in shape and guides the aft part of the support tray 108 in a substantially linear and substantially horizontal path. Guidance track 156 is curvilinear, having linear beginning and ending sections with an arcuate section transitioning between the end sections. The end sections of guidance track 156 are disposed at different heights from one another. Guidance track 156 guides the support tray 108 through its rotation during transitioning between the stowed and extended positions.

The combined influence of driving separate portions of the support tray 108 along the paths defined by the guidance tracks 132 and 156 results in a top edge of the front wall 136 of the support tray 108 scribing the path depicted by phantom line 182. The motion scribed by the top edge is initially linear, subsequently transitioning to an arcuate path as the support tray 108 is rotated downward to an angle 188 of approximately 35 degrees from the stowed position. In the extended position, limits stops 184 and 186 disposed on the support tray 108 and carrier 114, respectively, engage one another to impede further rotation of the support tray 108.

Figure 11:
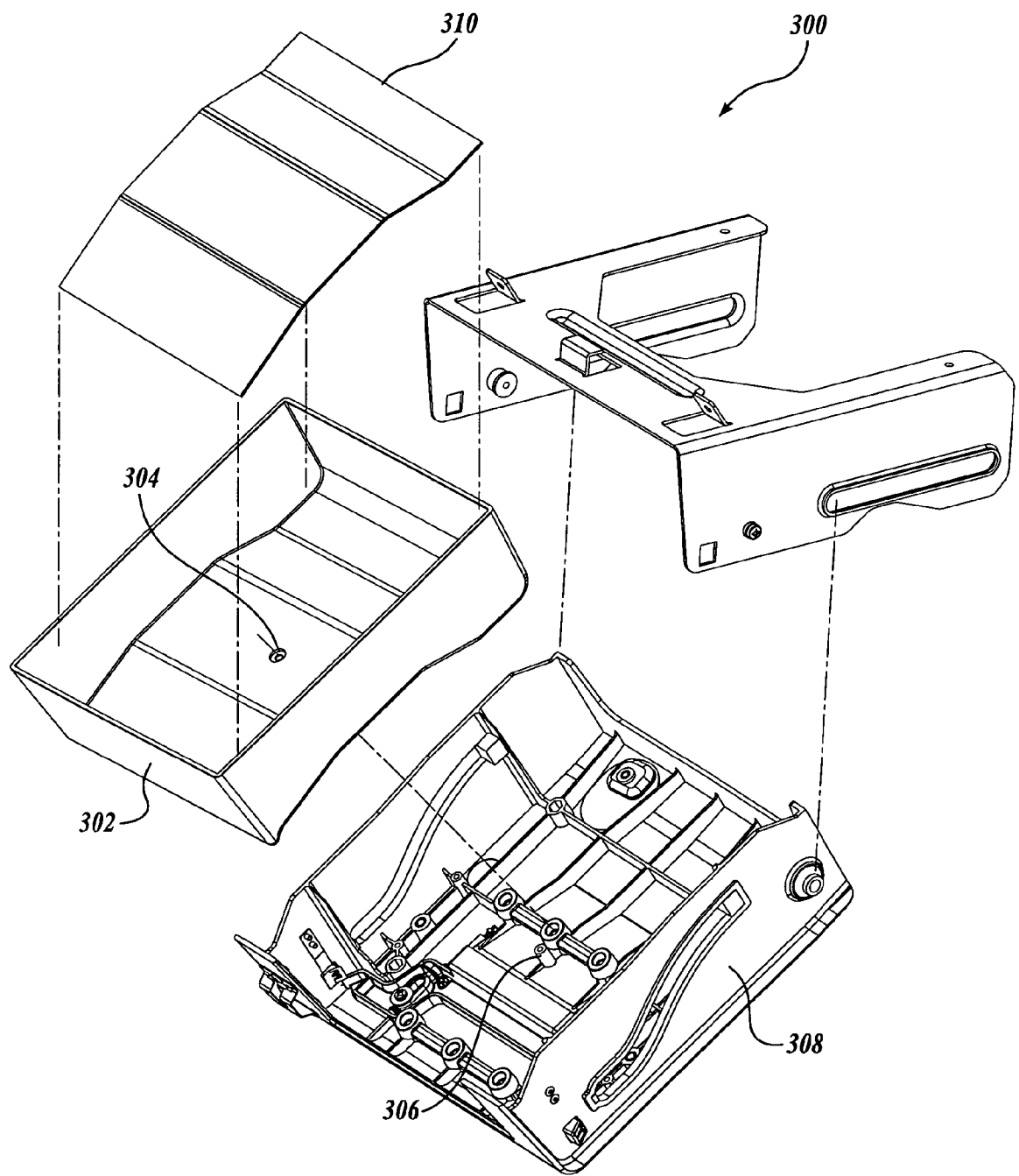
FIG. 11 is a perspective view of the instrument mounting assembly of FIG. 1 shown with the instrument removed and replaced with a storage bin and rubber mat, thereby showing the instrument mounting assembly of FIG. 1 configured in a storage mode.
Figure 12:
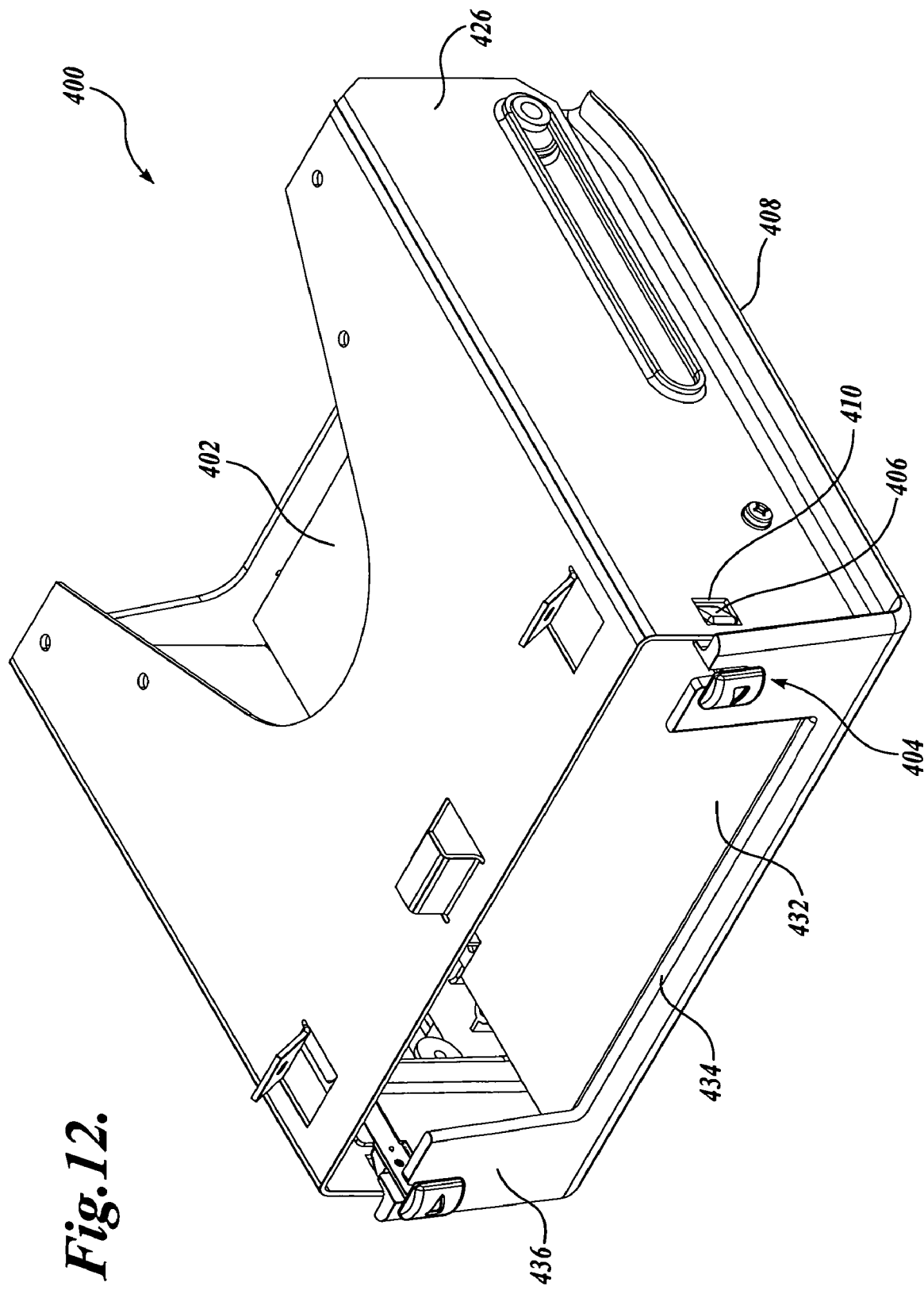
FIG. 12 is a perspective view of an alternate embodiment of an instrument mounting assembly formed in accordance with the present invention.
Figure 13:
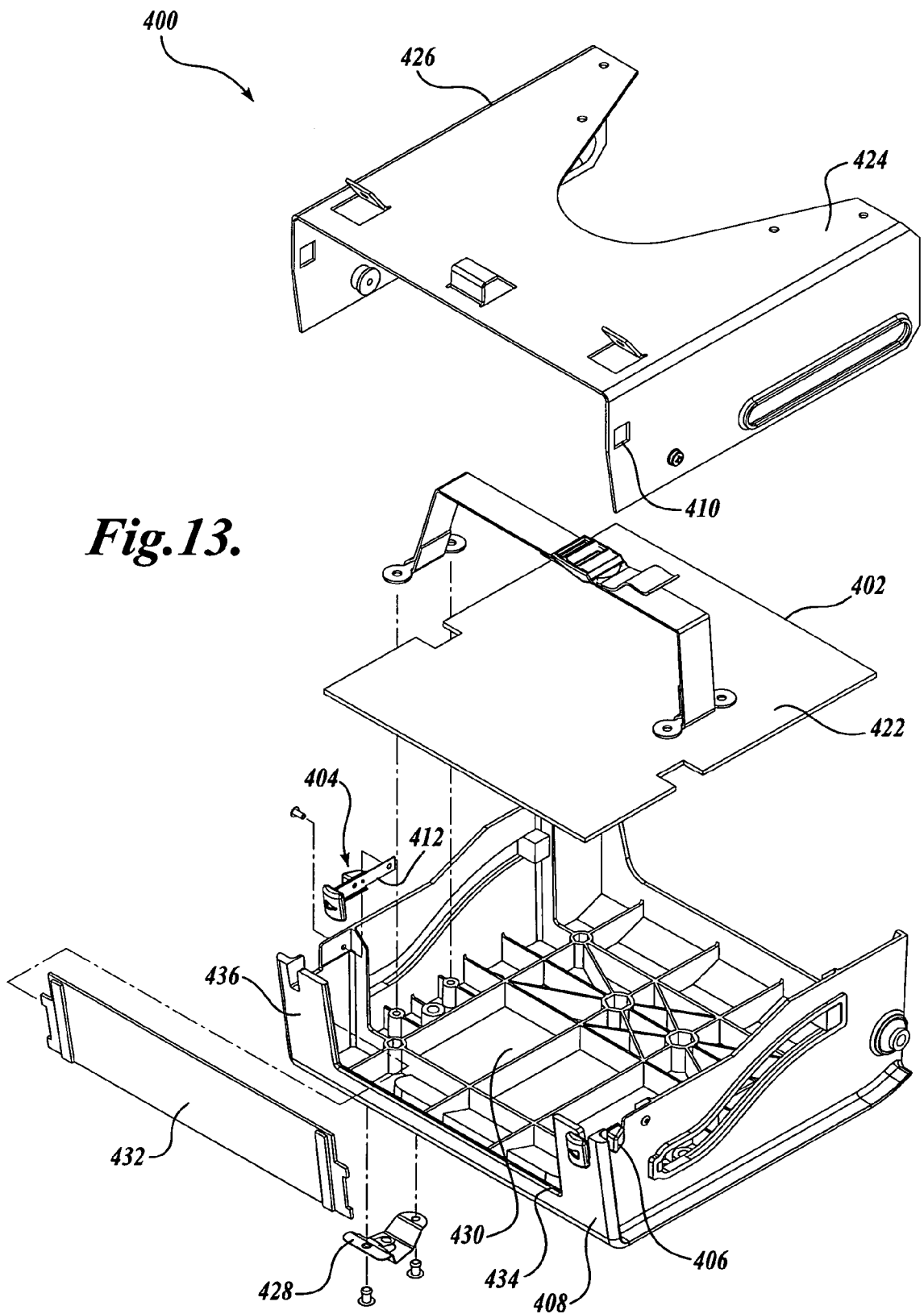
FIG. 13 is an exploded perspective view of the instrument mounting assembly depicted in FIG. 12.
Figure 14:
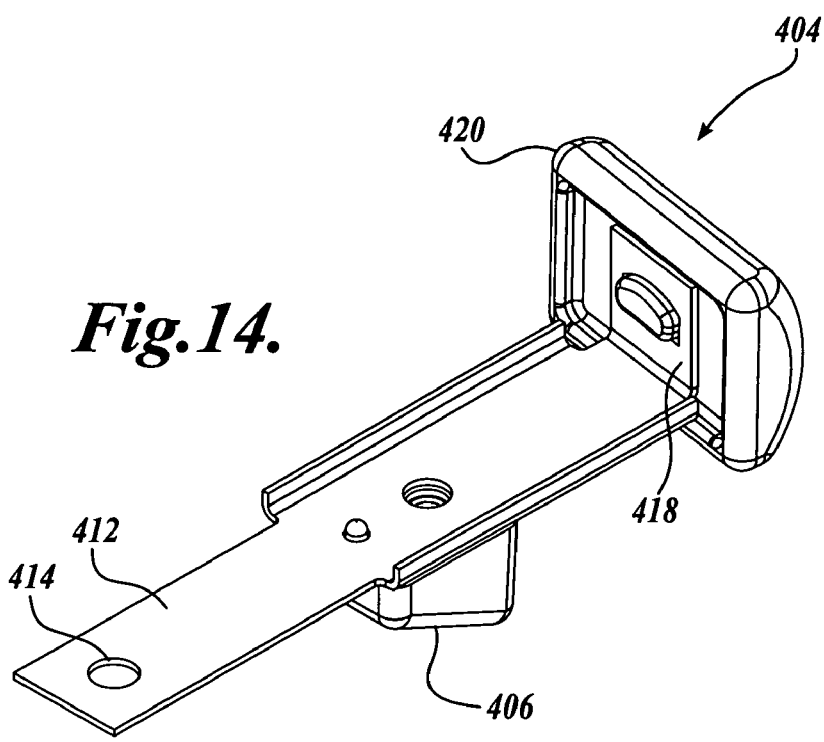
FIG. 14 is a perspective view of a release assembly suitable for use with the instrument mounting assembly depicted in FIGS. 12 and 13.
Figure 15:
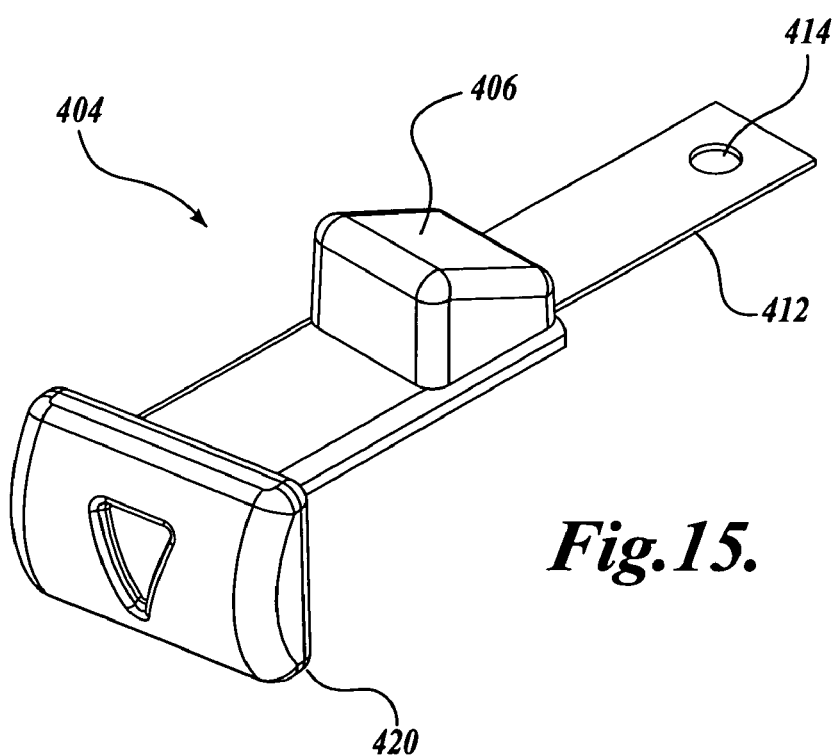
FIG. 15 is an alternate perspective view of the release assembly of FIG. 14.

Referring to FIG. 11, an alternate embodiment of an instrument mounting assembly 300 formed in accordance with the present invention is depicted. The instrument mounting assembly 300 of FIG. 11 is identical in construction and operation to the instrument mounting assembly 100 of FIGS. 1–10, with a few exceptions. In general, the instrument mounting assembly 300 is adapted for use as a stowage container, and not for use in the stowing of an instrument. More specifically, the instrument mounting assembly 300 is adapted to receive a stowage bin 302. The stowage bin 302 is suitably shaped and configured to fit within the support tray 308 of the instrument mounting assembly 300. In the illustrated embodiment, the stowage bin 302 is mounted to the support tray 308 via a fastener extending through a mounting hole 304 in the stowage bin 302 and engaging a stowage tray mounting post 306. A layer of material having a high coefficient of friction, such as a rubber mat 310, may be laid within the stowage bin 302 to impede the movement of articles stored in the stowage bin 302.

As stated above, the construction and operational features of the depicted alternate embodiment are identical to those described above for the embodiment illustrated and described with regard to FIGS. 1–10, and therefore will not be repeated herein for the sake of brevity. It is intended that a user may transition the instrument tray assembly 100 depicted in FIGS. 1–10 to the instrument tray assembly 300 depicted in FIG. 11 by simply removing the restraining strap 112 and installing the storage bin 302 and optionally, installing the rubber mat 310. Thus, if a user does not utilize a CB radio, the instrument tray assembly 100 can be easily converted to the storage assembly depicted in FIG. 11.

FIGS. 12–15 illustrate an alternate embodiment of an instrument mounting assembly 400 formed in accordance with the present invention. The instrument mounting assembly 400 is substantially similar to the above described embodiments, with a few exceptions. In lieu of the rubber mounts 158 (see FIG. 3) used in the above described embodiments for impeding the sliding movement of an instrument housed within the instrument mounting assembly, this embodiment uses a material having a high coefficient of friction, such as a rubber mat 402, laid on the bottom of the support tray 408, in lieu of the rubber mounts.

Further, this embodiment utilizes an alternately designed release assembly 404. The release assembly 404 utilizes a locking plunger 406 and a locking socket 410, similar in function and construction to the components bearing the same names in the previous embodiments. However, the manner of actuating the locking plunger 406 between a locked and unlocked position is different. In this embodiment, an elongate cantilever spring 412 is used. One end 414 of the cantilever spring 412 is anchored to the support tray 408 at a selected mounting location 416. Coupled to the mid portion of the cantilever spring 412 is the locking plunger 406. The cantilever spring 412 acts to normally bias the locking plunger 406 outward to thereby engage the locking socket 410 when the instrument mounting assembly 400 is in the stowed position.

Coupled to the opposing free end 418 of the cantilever spring 412 is an end piece 420. The end piece 420 is designed to permit a user to engage the free end 418 of the spring 412 and overcome the bias of the cantilever spring 412, to thereby disengage the locking plunger 406 from the locking socket 410. After the locking plunger 406 is disengaged from the locking socket 410, the instrument mounting assembly 400 may be transitioned into the extended position.

Also changed in this embodiment is the inclination of a support surface 422 of the support tray 408. The support surface 422 is the surface which supports the instrument when set within the support tray 408. In this embodiment, the support surface 422 is substantially horizontal and coplanar with the top wall 424 of the carrier 426. In the embodiments of FIGS. 1–11, the support surface 166 was inclined relative to the horizontal and to the top wall 118 such that the CB radio 102 disposed in the support tray 108 is actually inclined downward when in the stowed position.

Figure 16:
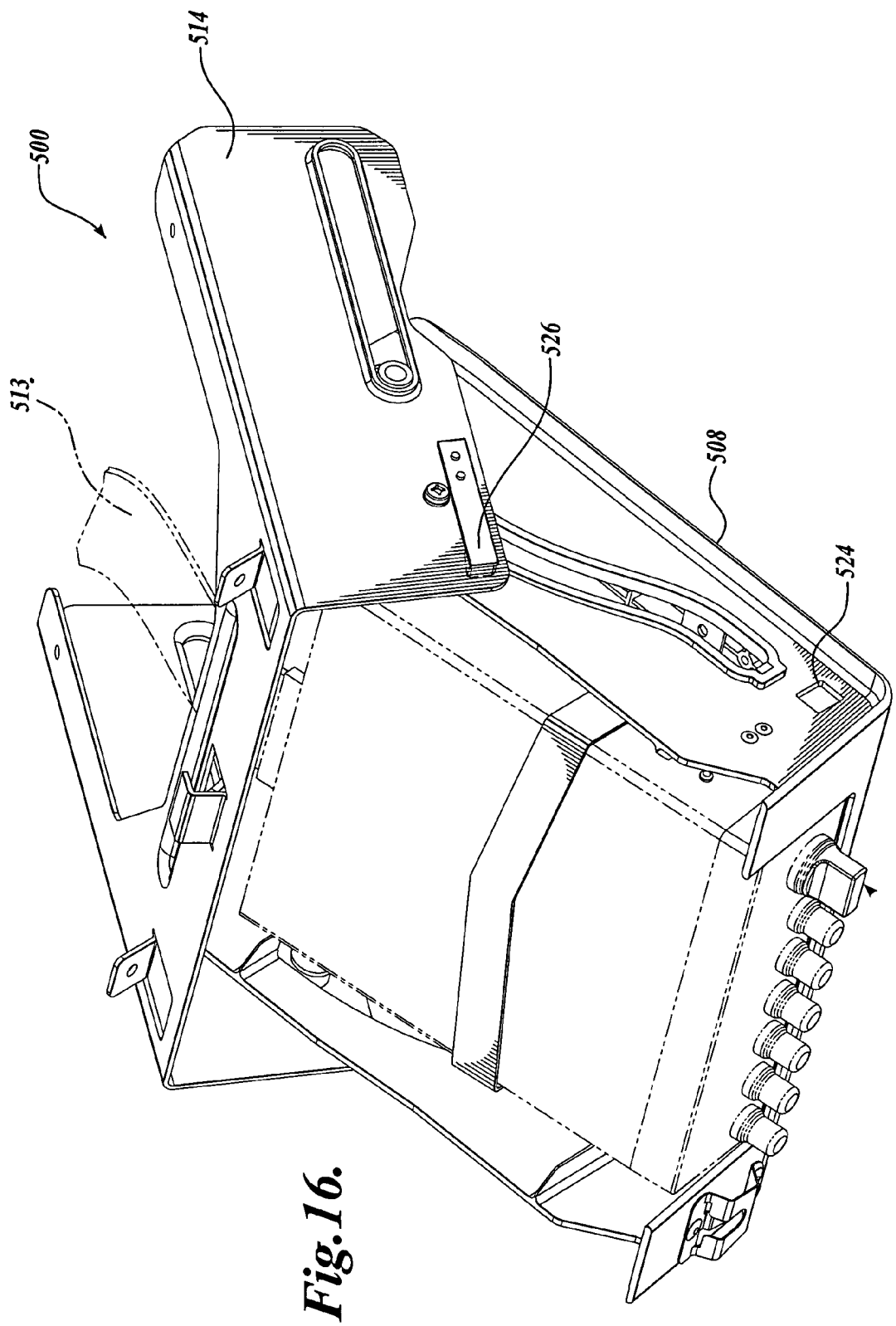
FIG. 16 is a perspective view of an alternate embodiment of an instrument mounting assembly formed in accordance with the present invention for mounting an instrument within a vehicle, the instrument mounting assembly including a carrier supporting a support tray to which the instrument is affixed, the instrument mounting assembly shown in an extended position.

FIG. 16 illustrates an alternate embodiment of an instrument mounting assembly 500 formed in accordance with the present invention. The instrument mounting assembly 500 is substantially similar to the above described embodiments, with a few exceptions. For instance, the locking socket 524 is now located on the support tray 508 and the locking plunger 526 is located on the carrier 514. In the previous embodiments, the locking socket was located on the carrier and the locking plunger was located on the support tray. Further, the embodiment of FIG. 16 is illustrated with the cable assembly 513 described in relation to the above embodiments but previously omitted from the drawings for purposes of clarity.

Also changed in this embodiment is the location of the microphone hanger 428, which is disposed on the underside of the bottom panel 430 of the support tray 408. Further, this embodiment utilizes a front plate 432 which may be selectively coupled to the support tray 408 to block a front opening 434 in the front wall 436, thus permitting the support tray 408 to be converted to a storage bin when a CB radio is not used.

While the preferred embodiment of the invention has been illustrated and described, it will be appreciated that various changes can be made therein without departing from the spirit and scope of the invention.

The embodiment of the invention which in which an exclusive property or privilege is claimed are defined as follows:

1. An instrument mounting assembly for mounting an instrument to a vehicle, the instrument mounting assembly comprising:
    (a) a carrier adapted to be coupled to the vehicle;
    (b) a support coupled to the carrier, the support adapted to support the instrument;
    (c) a first track disposed on the carrier;
    (d) a first follower disposed on the support for interfacing with the first track;
    (e) a second track disposed on the support;
    (f) a second follower disposed on the carrier for interfacing with the second track; and
    (g) wherein the support is movable relative to the carrier so that the support may be transitioned from a stowed position to an extended position, wherein the first and second followers interface with the first and second tracks causing the support to be both linearly displaced and rotated while the support is transitioned from the stowed to the extended position, wherein the first or second track is oriented at a predetermined average inclination, and wherein the other of the first or second track is oriented at a selected average inclination inclined relative to the predetermined average inclination to cause the support to rotate when transitioned between the stowed and extended position.

2. The instrument mounting assembly of claim 1, wherein the first or second track is substantially linear in shape, and the other of the first or second track includes an arcuate portion to cause the support to rotate when transitioned between the stowed and extended positions.

3. The instrument mounting assembly of claim 1, wherein the support is rotated 20 degrees or more when transitioned from the stowed position to the extended position.

4. The instrument mounting assembly of claim 1, wherein when the support is in the stowed position, the support and the carrier are in a substantially nested relationship relative to one another, wherein when the support is in the extended position, a majority of the support extends outward from the carrier.

5. The instrument mounting assembly of claim 1, further including a plunger coupled to either the carrier or the support, the plunger adapted to selectively and lockingly engage an aperture disposed in the other of the carrier or the support, such that when the plunger engages the aperture, the support is locked in the stowed position.

6. The instrument mounting assembly of claim 5, wherein the plunger is biased to normally engage the aperture.

7. The instrument mounting assembly of claim 1, wherein the carrier includes a top wall, two sidewalls, a substantially open front, a substantially open back, and a substantially open bottom.

8. The instrument mounting assembly of claim 7, wherein the support includes a substantially open top, two sidewalls, and a substantially open back.

9. The instrument mounting assembly of claim 8, wherein the first and second tracks and the first and second followers are disposed on the sidewalls of the carrier and the support.

10. The instrument mounting assembly of claim 1, wherein the instrument mounting assembly is operable to be transitioned from the stowed to the extended position while a cable assembly for providing power to the instrument remains connected to the instrument.

11. The instrument mounting assembly of claim 1, further including a limit stop disposed on each of the carrier and the support, wherein when the support is in the extended position, the limit stops engage one another to impede further rotation of the support.

12. The instrument mounting assembly of claim 1, further including:
    (a) a third track disposed on the carrier;
    (b) a third follower disposed on the support for interfacing with the third track;
    (c) a fourth track disposed on the support;
    (d) a fourth follower disposed on the carrier for interfacing with the fourth track; and
    (e) wherein the first, second, third, and fourth followers respectively interface with the first, second, third, and fourth tracks causing the support to be both linearly displaced and rotated while the support is transitioned from the stowed to the extended position.

13. The instrument mounting assembly of claim 1, further including a storage bin removably mounted to the support, the storage bin interchangeable with the instrument such that when an instrument is not attached to the support, the storage bin may be attached to the support and used to store objects.

14. An instrument mounting assembly for adjustably mounting an electronic device relative to a panel of a vehicle, the electronic device having a front face and a back surface, the instrument mounting assembly comprising:
    (a) a support for supporting the electronic device; and
    (b) a guide assembly for guiding the movement of the support between a stowed position, in which the electronic device coupled to the support is configured such that the front face of the electronic device is substantially flush with the panel, and an extended position, wherein the support is moved outward from the panel and rotated such that when the electronic device is attached to the support, the front face of the electronic device is spaced a selected distance outward of the panel and the electronic device is oriented at a predetermined inclination relative to the electronic device when in the stowed position to provide access to the electronic device.

15. The instrument mounting assembly of claim 14, further including a carrier adapted to be coupled to the vehicle and the support.

16. The instrument mounting assembly of claim 15, wherein the guide assembly includes:
    (a) a first track disposed on the carrier;
    (b) a first follower disposed on the support for interfacing with the first track;
    (c) a second track disposed on the support;
    (d) a second follower disposed on the carrier for interfacing with the second track; and
    (e) wherein the support is movable relative to the carrier so that the support may be transitioned from the stowed position to the extended position, wherein the first and second followers respectively interface with the first and second tracks causing the support to be both linearly displaced and rotated while the support is transitioned between the stowed and extended positions.

17. The instrument mounting assembly of claim 16, wherein the first or second track is substantially linear in shape, and the other of the first or second track includes an arcuate portion to cause the support to rotate when transitioned between the stowed and extended positions.

18. The instrument mounting assembly of claim 16, wherein the first or second track is oriented at a predetermined average inclination, and wherein the other of the first or second track is oriented at a selected average inclination inclined relative to the predetermined average inclination to cause the support to rotate when transitioned between the stowed and extended position.

19. The instrument mounting assembly of claim 16, wherein when the support is in the stowed position, the support and the carrier are in a substantially nested relationship relative to one another, and wherein when the support is in the extended position, a majority of the support extends outward from the carrier.

20. The instrument mounting assembly of claim 16, further including a plunger coupled to either the carrier or the support, the plunger adapted to selectively and lockingly engage an aperture disposed in the other of the carrier or the support, such that when the plunger engages the aperture, the support is locked in the stowed position.

21. The instrument mounting assembly of claim 16, wherein the plunger is biased to normally engage the aperture.

22. The instrument mounting assembly of claim 16, wherein the carrier includes a top wall, two sidewalls, a substantially open front, a substantially open back, and a substantially open bottom.

23. The instrument mounting assembly of claim 22, wherein the support includes a substantially open top, two sidewalls, and a substantially open back.

24. The instrument mounting assembly of claim 22, wherein the first and second tracks and the first and second followers are disposed on the sidewalls of the carrier and the support.

25. The instrument mounting assembly of claim 16, wherein the instrument mounting assembly is operable to be transitioned from the stowed to the extended position while a cable assembly for providing power to the electronic device remains connected to the electronic device.

26. The instrument mounting assembly of claim 16, further including a limit stop disposed on each of the carrier and the support, wherein when the support is in the extended position, the limit stops engage one another to impede further rotation of the carrier and to maintain the support at a selected inclination relative to the carrier.

27. The instrument mounting assembly of claim 16, further including:
    (a) a third track disposed on the carrier;
    (b) a third follower disposed on the support for interfacing with the third track;
    (c) a fourth track disposed on the support;
    (d) a fourth follower disposed on the carrier for interfacing with the fourth track; and
    (e) wherein the first, second, third, and fourth followers respectively interface with the first, second, third, and fourth tracks causing the support to be both linearly displaced and rotated while the support is transitioned from the stowed to the extended position.

28. An instrument mounting assembly for mounting an electronic device to a vehicle, the electronic device having a front face, the instrument mounting assembly comprising:
    (a) a support for supporting the electronic device, the support having a front portion; and
    (b) a coupling assembly for movably coupling the support to the vehicle such that the support may be selectively moved between a stowed position and an extended position, the coupling assembly having a rear guide assembly for guiding a rear portion of the support in a first path and a front guide assembly for guiding a second portion of the support in a second path, wherein when the support is transitioned from the stowed to the extended position, the front portion of the support moves in a predetermined path resulting from the movement of the rear and second portions of the support along the first and second paths, wherein the predetermined path is substantially linear as the support initially moves from the stowed position and transitions after a selected amount of travel of the support to an arcuate path such that the support is rotated when transitioned to the extended position, wherein the first path is substantially linear, and wherein the second path has a linear portion and an arcuate portion.

29. The instrument mounting assembly of claim 28, wherein the second path has linear end portions disposed at both ends of the second path and the arcuate portion is disposed between the linear end portions.

30. The instrument mounting assembly of claim 28, wherein the support is rotated 20 degrees or greater as the front portion of the support follows the predetermined path.

31. The instrument mounting assembly of claim 28, wherein a first average inclination of the first path is inclined relative to a second average inclination of the second path.

32. An instrument mounting assembly for removably mounting an electronic device to a vehicle having an instrument panel, the instrument mounting assembly comprising:
    (a) a support for supporting the electronic device; and
    (b) a coupling assembly for movably coupling the support to the vehicle such that the support may be selectively moved to place the electronic device between a stored position in which the electronic device is disposed substantially behind the instrument panel and an extended position in which the coupling assembly holds the support a selected distance outward of the instrument panel and inclined at a predetermined angle relative to the stowed position such that any cable assemblies coupled thereto are accessible while the electronic device is supported by the support.

33. An instrument mounting assembly for mounting an instrument to a vehicle, the instrument mounting assembly comprising:
    (a) a carrier adapted to be coupled to the vehicle;
    (b) a support coupled to the carrier, the support adapted to support the instrument;
    (c) a first track disposed on the carrier;
    (d) a first follower disposed on the support for interfacing with the first track;
    (e) a second track disposed on the support;
    (f) a second follower disposed on the carrier for interfacing with the second track;
    (g) wherein the support is movable relative to the carrier so that the support may be transitioned from a stowed position to an extended position, wherein the first and second followers interface with the first and second tracks causing the support to be both linearly displaced and rotated while the support is transitioned from the stowed to the extended position; and
    (h) wherein the first or second track is substantially linear in shape, and the other of the first or second track includes an arcuate portion to cause the support to rotate when transitioned between the stowed and extended positions.

34. An instrument mounting assembly for mounting an instrument to a vehicle, the instrument mounting assembly comprising:
    (a) a carrier adapted to be coupled to the vehicle;
    (b) a support coupled to the carrier, the support adapted to support the instrument;
    (c) a first track disposed on the carrier;
    (d) a first follower disposed on the support for interfacing with the first track;
    (e) a second track disposed on the support;
    (f) a second follower disposed on the carrier for interfacing with the second track;
    (g) wherein the support is movable relative to the carrier so that the support may be transitioned from a stowed position to an extended position, wherein the first and second followers interface with the first and second tracks causing the support to be both linearly displaced and rotated while the support is transitioned from the stowed to the extended position; and
    (h) wherein the support is rotated 20 degrees or more when transitioned from the stowed position to the extended position.

35. An instrument mounting assembly for mounting an instrument to a vehicle, the instrument mounting assembly comprising:
    (a) a carrier adapted to be coupled to the vehicle;
    (b) a support coupled to the carrier, the support adapted to support the instrument;
    (c) a first track disposed on the carrier;
    (d) a first follower disposed on the support for interfacing with the first track;
    (e) a second track disposed on the support;
    (f) a second follower disposed on the carrier for interfacing with the second track;
    (g) wherein the support is movable relative to the carrier so that the support may be transitioned from a stowed position to an extended position, wherein the first and second followers interface with the first and second tracks causing the support to be both linearly displaced and rotated while the support is transitioned from the stowed to the extended position; and
    (h) a plunger coupled to either the carrier or the support, the plunger adapted to selectively and lockingly engage an aperture disposed in the other of the carrier or the support, such that when the plunger engages the aperture, the support is locked in the stowed position.

36. An instrument mounting assembly for mounting an instrument to a vehicle, the instrument mounting assembly comprising:
    (a) a carrier adapted to be coupled to the vehicle;
    (b) a support coupled to the carrier, the support adapted to support the instrument;
    (c) a first track disposed on the carrier;
    (d) a first follower disposed on the support for interfacing with the first track;
    (e) a second track disposed on the support;
    (f) a second follower disposed on the carrier for interfacing with the second track;
    (g) wherein the support is movable relative to the carrier so that the support may be transitioned from a stowed position to an extended position, wherein the first and second followers interface with the first and second tracks causing the support to be both linearly displaced and rotated while the support is transitioned from the stowed to the extended position; and (h) wherein the carrier includes a top wall, two sidewalls, a substantially open front, a substantially open back, and a substantially open bottom.

37. An instrument mounting assembly for mounting an instrument to a vehicle, the instrument mounting assembly comprising:
   (a) a carrier adapted to be coupled to the vehicle;
   (b) a support coupled to the carrier, the support adapted to support the instrument;
   (c) a first track disposed on the carrier;
   (d) a first follower disposed on the support for interfacing with the first track;
   (e) a second track disposed on the support;
   (f) a second follower disposed on the carrier for interfacing with the second track;
   (g) wherein the support is movable relative to the carrier so that the support may be transitioned from a stowed position to an extended position, wherein the first and second followers interface with the first and second tracks causing the support to be both linearly displaced and rotated while the support is transitioned from the stowed to the extended position; and
   (h) wherein the instrument mounting assembly is operable to be transitioned from the stowed to the extended position while a cable assembly for providing power to the instrument remains connected to the instrument.

38. An instrument mounting assembly for mounting an electronic device to a vehicle, the electronic device having a front face, the instrument mounting assembly comprising:
   (a) a support for supporting the electronic device, the support having a front portion; and
   (b) a coupling assembly for movably coupling the support to the vehicle such that the support may be selectively moved between a stowed position and an extended position, the coupling assembly having a rear guide assembly for guiding a rear portion of the support in a first path and a front guide assembly for guiding a second portion of the support in a second path, wherein when the support is transitioned from the stowed to the extended position, the front portion of the support moves in a predetermined path resulting from the movement of the rear and second portions of the support along the first and second paths, wherein the predetermined path has at least an arcuate portion such that the support is rotated when transitioned to the extended position, and wherein the second path has linear end portions disposed at both ends of the second path and the arcuate portion is disposed between the linear end portions.

39. An instrument mounting assembly for mounting an electronic device to a vehicle, the electronic device having a front face, the instrument mounting assembly comprising:
   (a) a support for supporting the electronic device, the support having a front portion; and
   (b) a coupling assembly for movably coupling the support to the vehicle such that the support may be selectively moved between a stowed position and an extended position, the coupling assembly having a rear guide assembly for guiding a rear portion of the support in a first path and a front guide assembly for guiding a second portion of the support in a second path, wherein when the support is transitioned from the stowed to the extended position, the front portion of the support moves in a predetermined path resulting from the movement of the rear and second portions of the support along the first and second paths, wherein the predetermined path is substantially linear as the support initially moves from the stowed position and transitions after a selected amount of travel of the support to an arcuate path such that the support is rotated when transitioned to the extended position, and wherein the support is rotated 20 degrees or greater as the front portion of the support follows the predetermined path.

40. An instrument mounting assembly for mounting an electronic device to a vehicle, the electronic device having a front face, the instrument mounting assembly comprising:
   (a) a support for supporting the electronic device, the support having a front portion; and
   (b) a coupling assembly for movably coupling the support to the vehicle such that the support may be selectively moved between a stowed position and an extended position, the coupling assembly having a rear guide assembly for guiding a rear portion of the support in a first path and a front guide assembly for guiding a second portion of the support in a second path, wherein when the support is transitioned from the stowed to the extended position, the front portion of the support moves in a predetermined path resulting from the movement of the rear and second portions of the support along the first and second paths, wherein the predetermined path is substantially linear as the support initially moves from the stowed position and transitions after a selected amount of travel of the support to an arcuate path such that the support is rotated when transitioned to the extended position, and wherein a first average inclination of the first path is inclined relative to a second average inclination of the second path.

41. An instrument mounting assembly for mounting an electronic device to a vehicle, the electronic device having a front face, the instrument mounting assembly comprising:
   (a) a support for supporting the electronic device, the support having a front portion; and
   (b) a coupling assembly for movably coupling the support to the vehicle such that the support may be selectively moved between a stowed position and an extended position, the coupling assembly having a rear guide assembly for guiding a rear portion of the support in a first path and a front guide assembly for guiding a second portion of the support in a second path, wherein when the support is transitioned from the stowed to the extended position, the front portion of the support moves in a predetermined path resulting from the movement of the rear and second portions of the support along the first and second paths, wherein the predetermined path has at least an arcuate portion such that the support is rotated when transitioned to the extended position, wherein the first path is substantially linear, and wherein the second path has linear end portions disposed at both ends of the second path and an arcuate portion disposed between the linear end portions.

42. The instrument mounting assembly of claim 41, wherein the support is rotated 20 degrees or greater as the front portion of the support follows the predetermined path.

43. The instrument mounting assembly of claim 41, wherein a first average inclination of the first path is inclined relative to a second average inclination of the second path.

* * * * *